Nov. 12, 1935.   L. S. WILLIAMS   2,020,982
RECORDING SCALE
Filed July 22, 1929   4 Sheets-Sheet 1
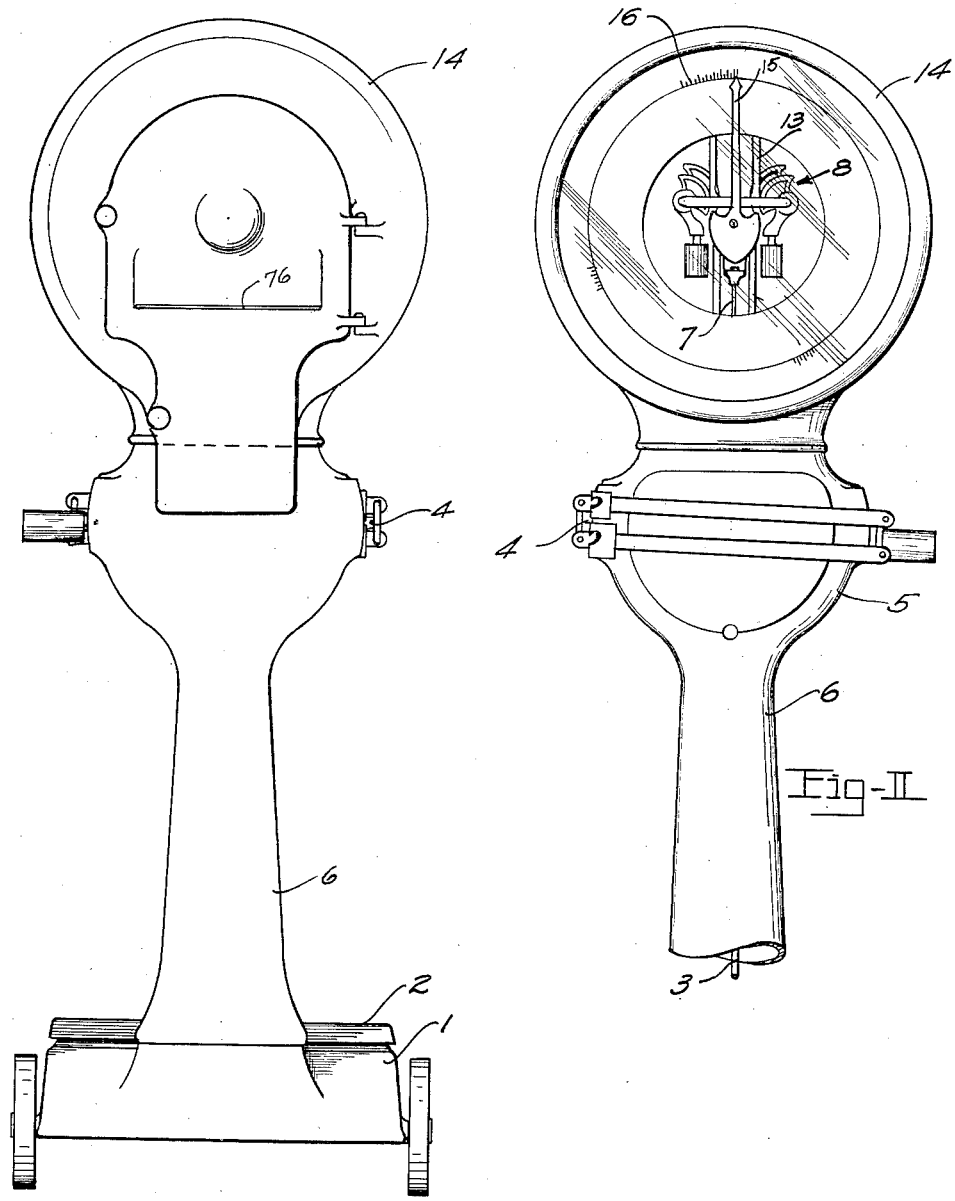
Fig-I   Fig-II
Inventor
Lawrence S. Williams
By C. O. Marshall
Attorney

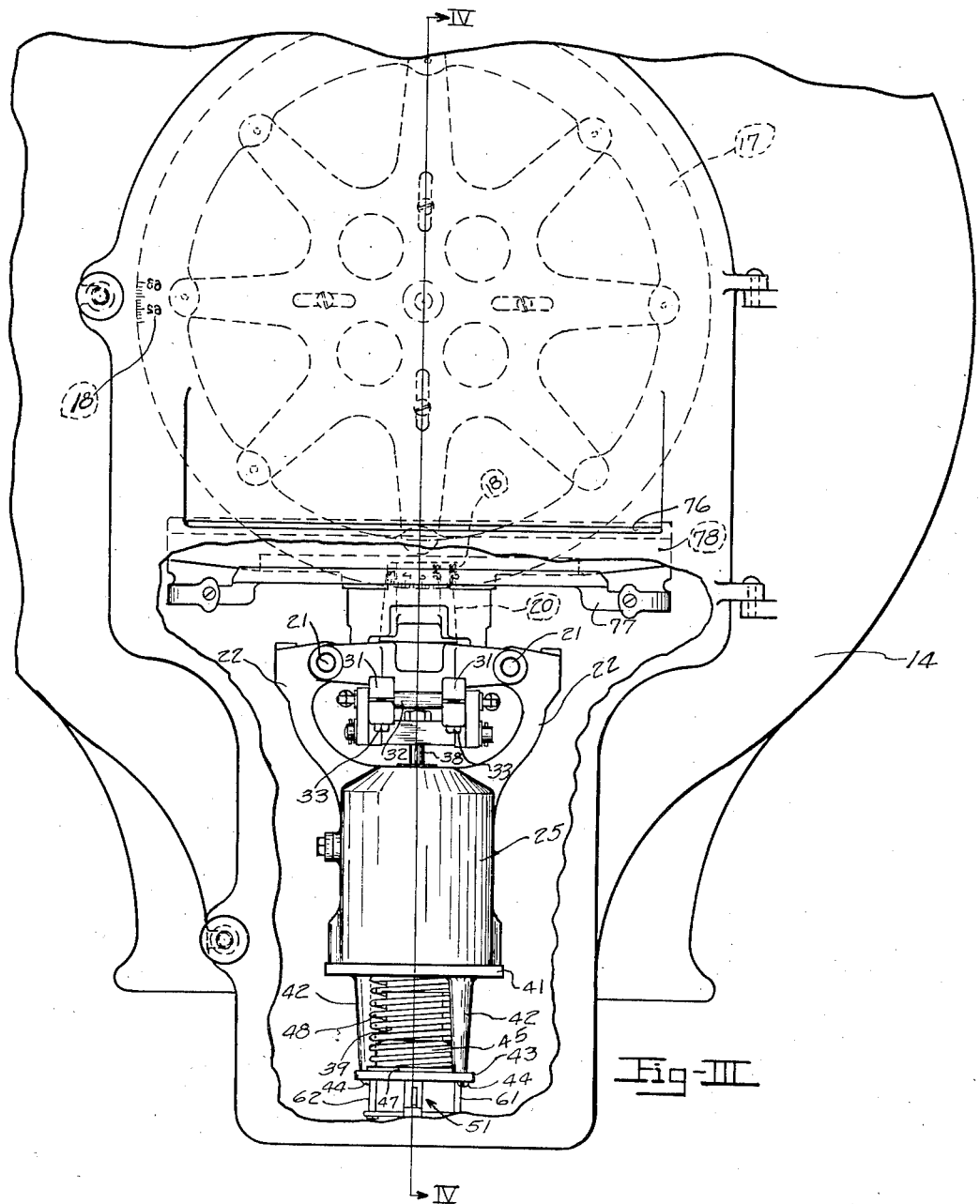

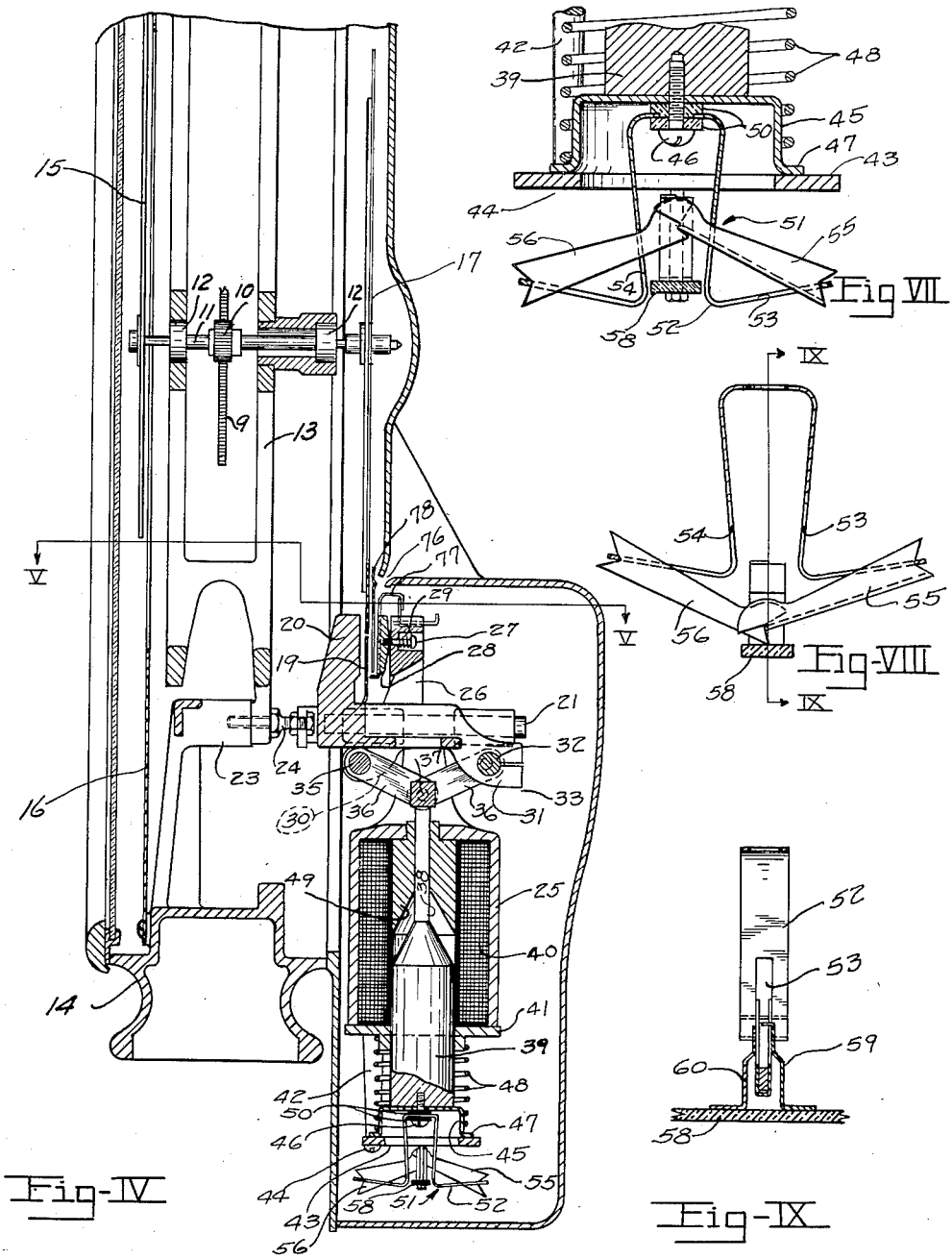

Nov. 12, 1935.                L. S. WILLIAMS                2,020,982
                              RECORDING SCALE
                           Filed July 22, 1929            4 Sheets-Sheet 4
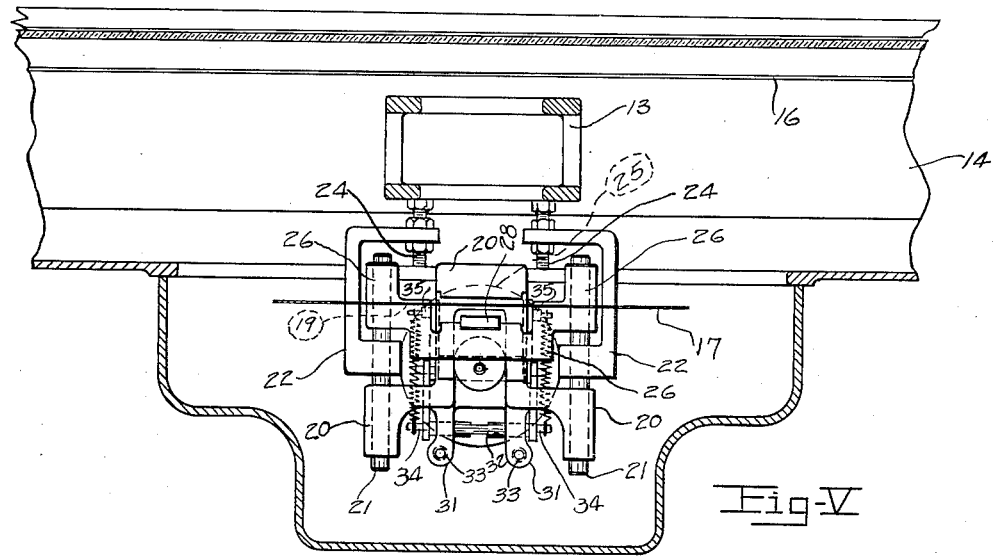
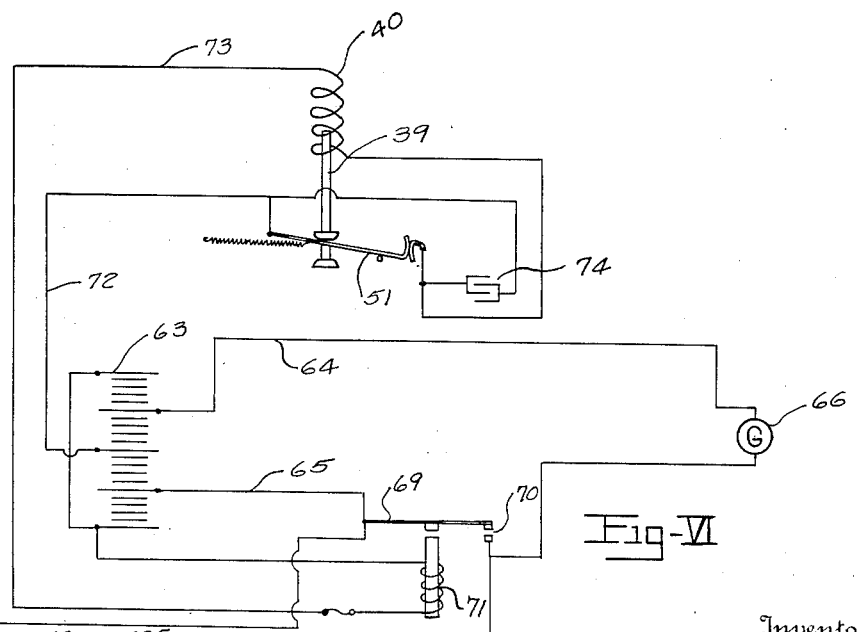
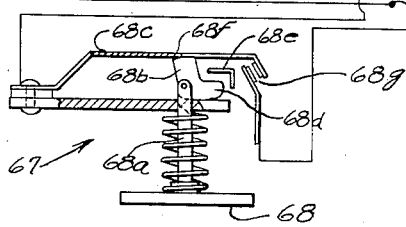
Inventor
Lawrence S Williams
By C. O. Marshall
        Attorney Patented Nov. 12, 1935

2,020,982

UNITED STATES PATENT OFFICE 2,020,982

RECORDING SCALE

Lawrence S. Williams, Toledo, Ohio, assignor to Toledo Scale Manufacturing Company, Toledo, Ohio, a corporation of New Jersey Application July 22, 1929, Serial No. 380,159

15 Claims. (Cl. 265—5)

This invention relates to recording scales and particularly to recording scales which automatically print the weight of a commodity as determined by a scale, thus recording the weight on bills of lading, invoices, receipts or other papers. A scale of this type furnishes a memorandum of the weight, which may be given to the customer or patron. A carbon copy may constitute a check to be forwarded to the cashier or the clerical department, so mistakes in transcribing the weight are avoided and an accurate record is furnished to both parties to the transaction.

In weighing scales it is desirable that the endicating element have a great relative movement, the movement of the indicator often being several hundred times as great as the movement of the platform. Since the force available to move the indicator approaches zero as the indicator approaches the indicating position, it is evident that the slightest friction in the indicator bearing will cause the indicator to stop slightly out of the correct indicating position. In non-recording scales friction in the indicator is reduced to a minimum by making the indicator as light as possible and supporting it either on knife edges or on ball bearings of the most delicate character. In recording scales the type carrying wheel must not only have the same relatively large movement, but it must also be so designed that no undue strains are transmitted to the bearings during the printing operation. It must also be of such design that slight deformations caused by the continuous use do not affect the accuracy of the record.

The principal object of the invention is the provision of a recording scale having a type wheel which is very light and in which the printing operation throws no undue strain on the bearings.

A further object is the provision of means whereby the type are arranged on the face of a thin, light wheel.

A further object is the provision of means whereby the type are protected against deposits which might otherwise cause an unbalanced condition of the type wheel and result in an indistinct record.

A further object is the provision of means obviating the use of liquid ink for printing the weight.

A still further object is the provision of means wherein the printing is accomplished by squeezing the record, bill of lading or other document against the type wheel between two relatively movable surfaces.

Another object is the provision of a type wheel which may be made economically and very accurately by an etching process.

A still further object is the provision of means whereby a weighing scale of known construction may be converted into a printing and recording scale.

Other objects and advantages will be apparent from the following description in which reference is had to the accompanying drawings illustrating a preferred embodiment of my invention, wherein similar reference numerals designate similar parts throughout the several views.

Referring to the drawings in detail:—

Figure I is a rear elevational view of a scale embodying my invention.

Figure II is a fragmentary front elevational view thereof.

Figure III is an enlarged rear elevational fragmentary view, parts being broken away, of the recording mechanism.

Figure IV is a fragmentary section of the printing and recording arrangement taken substantially along the line IV—IV of Figure III.

Figure V is a fragmentary plan sectional view taken substantially along the line V—V of Figure IV.

Figure VI is a wiring diagram of an electrical circuit, the switch being shown schematically.

Figure VII is an enlarged side elevation of the stroke switch in the dormant position.

Figure VIII is another fragmentary elevational view of the stroke switch, parts shown in section. This illustration shows the switch in the momentary "off" position and Figure IX is a fragmentary section thereof taken substantially along the line IX—IX of Figure VIII.

Refering to the drawings in detail, the scale per se, to which I have shown my invention attached, is the one fully described and illustrated in United States Patent #1,543,919 to Halvor O. Hem and I will therefore describe it only in so far as is necessary to fully and clearly describe the present invention.

A base 1 suitably supports and houses a load supporting lever system (not shown), on which in the usual manner, is mounted a platform 2 on which the loads to be weighed are placed. A rod 3 is pivotally connected to the nose of the lower lever system, at its lower end. The upper end of this rod 3 engages pivotally a lever 4 which is suitably housed and supported in the enlarged upper portion 5 of the column 6. A rod 7 connects the lever 4 to the weight counterbalancing pendulums 8. These pendulums offset the loads placed on the platform. They are adapted to swing outwardly and upwardly to an angular distance proportional to the weight of the load on the platform. The teeth of a rack 9, which is secured to a moving part attached to the pendulums 8, engage the teeth of a pinion 10 which surrounds and is fastened to the shaft 11. The shaft 11 is mounted in anti-friction ball bearings 12, which are fixed in a stationary frame 13 which is located in the housing 14. The pendulums 8 are also suspended from this frame by suitable flexible, metallic ribbons.

When a load is placed on the platform 2 and it is counterbalanced by the pendulums the indicator 15, which is also secured to the shaft 11, is rotated through an angle which is proportional to the weight, by the cooperation of the rack 9 and the pinion 10. The indicator thus points to the proper weight character on the chart 16 which is stationed within the housing 14.

The scale thus far described is a weighing scale of which large numbers are in use. It has been stated that one of the objects of this invention is the provision of means whereby an ordinary weighing scale may be converted by the simple addition of parts into a printing and recording scale.

The shaft 11, to which the indicator 15 is fastened, has also secured thereto a type wheel 17 on the opposite end. This type wheel 17 is made of thin, light metal and has the graduations and figures 18 (III) etched in relief on one of its faces. These figures and graduations correspond to the figures and graduations on the chart 16 and represent the weights of commodities. Directly beneath and in the plane of the wheel 17, an index plate 19 is stationed. This index plate is fastened in a manner so that it may be accurately aligned with the chart 16. A raised indicating line or arrow is provided for pointing to a character on the type wheel 17. It will now be seen that when a weight of a commodity is indicated on the chart 16 by the indicator 15, the index line or arrow on the index plate 19 will simultaneously register with the proper weight character on the type wheel. The printing mechanism consists of an abutment 20 which is slidably mounted on track or guide members 21. These guide members are securely fastened to brackets 22 which form integral parts of the solenoid housing 25 and are securely fastened to a part 23 of the housing 14 by the retaining studs 24. The track or guide members 21 also support and guide a platen frame 26. This is also movable on the track members. Set into a recess of the platen frame 26 and retained by a screw 27 is a platen 28. The back of the platen is made slightly spherical where it rests against the platen frame so that its face may align itself to another surface. A spring 29 is interposed between the platen frame 26 and the underside of the head of the screw 27 urging it outwardly and thus firmly holding the alignable platen 28 in its proper position.

Depending from the abutment 20 and the platen frame 26 are four short projections or arms 31 and 30 respectively. The two arms 31 which form an integral part of the abutment 20 are provided with apertures in which a shaft 32 is mounted and locked in position by the clamp screws 33. The two short arms 30 similarly support a shaft 35. The shafts 32 and 35 respectively are connected by means of toggle links 36 to a horizontal connecting shaft 37 to which is fastened an extension 38 of a solenoid core 39 which has a reciprocating motion within a solenoid coil 40, located within the solenoid housing 25. The coil 40 is retained within the housing 25 by a cover plate 41 which is secured to the solenoid housing 25 by means of screws (not shown). An annular solenoid core stop plate 43 is secured by means of the screws 44 to two depending studs 42. The two studs 42 are integral with the cover plate 41. A spring 48 surrounds the core 39 and presses upwardly against the cover plate 41 and downwardly against a flange 47 of a cup like member 45 which is secured to the lower end of the core 39 by the screw 46. The spring 48 thus constantly urges the core 39 into its lower position against the stop plate 43. The upward motion of the core is limited by the core end stop 49.

Attached to the core 39 by the screw 46 and electrically insulated therefrom by the di-electric washers 50 is an over center stroke switch 51. The stroke switch 51 comprises a flexible frame 52 provided with laterally extending wing portions. The frame 52 is provided with slots 53 and 54 in which the switch members 55 and 56 are retained respectively. A stationary part comprising a di-electric plate 58 has the contact members 59 and 60 secured thereto. The plate 58 with the contact members 59 and 60 is located beneath the core stop plate 43 and is spaced therefrom by the studs 61 and 62. When the scale is operated the stroke switch will assume successively the positions as shown by Figures VII and VIII.

Figure VI is a wiring diagram of the electrical circuit. The parts shown therein are represented schematically only, and it is to be understood that any suitable part may be used in this construction. Solenoid coils which operate on direct current are much simpler to build and more dependable. For this reason a rectifier 63 is provided to convert the alternating current to direct current. The wires 64 and 65 are in series with the source 66 of the alternating current. The wire 65 is broken by a normally open contact 70 controlled by a relay switch 69. A transitory switch 67 is in parallel with the relay switch 69. The transitory switch 67 consists of a push button 68 which is attached to a spring urged plunger 68a to whose end a dog 68b is pivotally fastened. When the plunger 68a is pressed, the dog 68b is carried upwardly raising one end of a contact spring 68c. This movement continues until the projection 68d on the dog 68b strikes an abutment 68e. The pressure, however, urges the dog further and as it is held by the abutment 68e, it revolves slightly in a clockwise direction, allowing the shoulder 68f of the contact spring 68c to slide off the dog 68b. The spring 68c then snaps downwardly, making a momentary contact at the contact points 68g which are normally open, thus closing the alternating current circuit. The rectifier 63 is now energized and feeds direct current to the relay electro-magnet 71. The flux set up therein keeps the contact 70 closed until the contact of the stroke switch 51; attached to the solenoid core, and which operates within the main solenoid coil 40, which is fed direct current by the wires 72 and 73, is broken. A condenser 74 is provided to prevent excessive sparking at the contacts of the switch 51.

When the contact of the stroke switch 51 is broken, the supply of direct current ceases instantly. This deenergizes the relay electro-magnet 71 which allows the contact 70 on the relay switch 69 to open. This cycle has a duration of only a fraction of a second. It will be seen that when the pressure on the push button 68 of the switch 67 is released, the dog is pivoted in such a manner that it will not cause a contact to be made at the contact points 68g on its downward stroke, thus preventing an unwanted repetition of the printing operation. The core 39 urged by the spring 48 returns to its bottom position, carrying the stroke switch 51 with it, which again closes, its contacts thus resuming a position so that the cycle may be instantly repeated.

Assuming that a load weighing 70 pounds is to be weighed and the weight recorded; when the load is placed on the platform, it is counterbalanced by the upwardly and outwardly swinging pendulums 8 located within the housing 14. The indicator 15 which is actuated by the counterbalancing pendulums moves an angular distance proportional to the weight, and points to the proper weight character on the chart 16. When there is no load on the platform 2, the zero character on the face of the type wheel also registers with the indicating line or arrow on the index plate 19. The type wheel being attached to the same shaft is rotated through the same angular movement as the indicator, and in this example when the load is counterbalanced, the seventy pound character on the type wheel will register with the index line on the plate 19. Special forms of bills of lading, receipts, or other documents, are required by this invention. As it is customary to retain a copy of these documents, these special forms consist of an original which may be printed on paper of ordinary thickness, a copy sheet, of thin translucent paper, and a sheet of double faced carbon paper which is interposed between the other two sheets. When the scale, after placing the load on the platform, has come to rest, this special form of bill of lading or other document just described is inserted in the slot 76 (see Figure IV) and is guided into the proper position in front of the type wheel 17 and the index plate 19 by the guide members 77 and 78. Pressure on the push button causes, as has previously been described, the coil 40 to be energized. The core 39 moves upwardly and causes, by means of the coil extension 38 and the shaft 37, the toggle links 36 secured thereto, to assume a substantially horizontal position, forcing the abutment 20 with the alignable platen 28 towards each other. As the type wheel 17 and the index plate 19 are located between the abutment 20 and the platen 28; the afore-mentioned bill of lading or other document previously inserted in the slot 76 and now positioned in front of the type wheel and index, is pressed against the face of the type on the latter and an impression is made of the arrow or index pointing at the proper weight character.

The shaft 32 held in the short arms 31 which form a part of the abutment has its ends 34 machined eccentrically to its axis. It will be seen that by turning the shaft 32 slightly the proper amount of clearance between the abutment of the platen at the instant of printing is obtained. The weight is printed correctly on the original of the afore-mentioned document. However, on the copy, the graduations and numerals appear on the back and are therefore in a reversed position. However, as the paper is translucent, they may be read from the front where they appear correctly.

It will be seen that all of the objects of the invention are efficiently attained. The embodiment of my invention herein shown and described, however, is to be susceptible to variation, modification, and change within the spirit and scope of the subjoined claims.

Having described my invention, I claim:

1. In a scale of the type described, in combination, weight counterbalancing and recording mechanism, said mechanism including a revoluble type disc of thin light flexible metal co-operating with a stationary plate bearing an index type mounted approximately in the plane of said disc, means for pressing against a portion of said disc and of said index plate in a direction parallel to the axis of rotation of said disc and means for pressing sheets of paper against the opposite side of said portion.

2. In a recording scale, in combination, weight offsetting and recording mechanism, said mechanism including a relatively movable type bearing disc of thin light, flexible material and a stationary plate of similar material bearing an index character, mounted approximately in the plane of revolution of said type bearing disc, a slidably mounted abutment, a slidably mounted platen frame and means for causing said sliding members to press on the opposite sides of said type bearing and index members.

3. In a recording scale, in combination, weight offsetting and recording mechanism, said mechanism including a relatively movable flat circular disc of thin flexible metal bearing indicia and a stationary plate of similar material bearing an index character mounted approximately in the plane of revolution of said indicia bearing disc, a slidably mounted abutment and a slidably mounted platen frame with a self aligning platen and electrically operated means for causing said members to press on the opposite sides of said indicia bearing members, said electrically operated means including a solenoid coil, a solenoid core having an extension and toggle links pivotally connected to said extension and said sliding members.

4. In a recording scale, in combination, weight offsetting and recording mechanism, said mechanism including a relatively movable flat circular disc of thin flexible metal bearing indicia and a stationary plate of similar material bearing an index character, mounted approximately in the plane of revolution of said type bearing disc, a slidably mounted abutment and a slidably mounted platen frame with a self aligning platen and electrically operated means for causing said abutment and platen to press on the opposite sides of said type bearing members, said electrically operated means including a solenoid coil, a solenoid core having an extension and toggle links pivotally connected to said extension and said sliding members, said solenoid core being spring urged into one position.

5. In a recording scale, in combination, weight offsetting and recording mechanism, said mechanism including a relatively movable flat circular disc of thin flexible metal bearing indicia and a stationary plate of similar material bearing an index character mounted approximately in the plane of revolution of said indicia bearing disc, a slidably mounted abutment and a slidably mounted platen frame with a self aligning platen and electrically operated means for causing said abutment and platen to press on the opposite sides of said indicia bearing members, said electrically operated means including a solenoid coil, a solenoid core having an extension and toggle links pivotally connected to said extension and said sliding members, said solenoid core being spring urged into one position, and having a stroke of predetermined length and means for interrupting the electrical current at the end of said stroke.

6. In a recording scale, in combination, weight offsetting and recording mechanism, said mechanism having a disc of thin light metal bearing raised weight graduations and numerals, electrically energized means for obtaining an impression of a portion of said graduations and numerals on paper, and a transitory switch for initiating the flow of the electrical energizing current.

7. In a recording scale, in combination, weight offsetting and recording mechanism, said mechanism having a disc of thin light metal bearing raised weight graduations and numerals, electrically energized means for obtaining an impression of a portion of said graduations and numerals on paper and a transitory switch initiating the flow of the electrical energizing current, said transitory switch having a contact duration of predetermined length.

8. In a recording scale, in combination, weight offsetting and recording mechanism, said mechanism including a disc of thin light flexible metal bearing indicia, a plate of similar material bearing a character mounted in the plane of said thin metallic disc, electrically energized means for obtaining an impression of said graduations and numerals on paper, said electrical means including a transitory, current flow initiating switch and a switch operated by a moving member to interrupt the flow of the electrical energizing current.

9. In a device of the type described, means for weighing and recording the weights of loads, said means including a disc of light, flexible metal bearing indicia and a stationary index plate bearing a character, mounted in the plane of said disc, record receiving means consisting of two sheets of paper with pigment interposed between said sheets, one of said sheets being thin and translucent and adapted to have an impression made on its back to be read from the front and means for pressing said record receiving means against said disk and index plate.

10. In a recording scale, in combination, weight offsetting, indicating and recording means, said means including a relatively movable type disk of thin, flexible metal bearing indicia and an index plate bearing a character, means for backing said index plate and type bearing disc, electrically energized means for making an impression of a portion of said type on paper, said electrical means being energized by direct current and rectifying means for converting alternating current to direct current.

11. In a device of the class described, in combination, automatic weighing and weight printing mechanism, said mechanism including a thin flexible disk, a platen frame, a self-aligning platen carried by said frame and adapted to be pressed against a portion of the face of said disk, and means for moving said platen frame toward and away from said disk.

12. In a device of the class described, in combination, automatic weighing and weight printing mechanism, said mechanism including a thin flexible disk, a platen frame, a self-aligning platen carried by said frame and adapted to be pressed against a portion of the face of said disk, means for moving said platen frame toward and away from said disk, a movable abutment adapted to be pressed against the other side of said disk, and means for moving said abutment toward and away from said disk.

13. In a device of the class described, in combination, automatic weighing and weight printing mechanism including automatic load-counterbalancing mechanism, a flexible type carrying disk of thin material, and means connecting said disk to said automatic load-counterbalancing mechanism to be revolved thereby.

14. In a device of the class described, in combination, automatic weighing and weight printing mechanism including automatic load-counterbalancing mechanism, a flexible type carrying disk of thin material, means connecting said disk to said automatic load-counterbalancing mechanism to be revolved thereby, members located on opposite sides of said disk, and means for moving said members toward each other to press a portion of said disk between them.

15. In a device of the class described, in combination, weighing and weight printing mechanism including pendulum load-counterbalancing mechanism, a flexible disk of thin material, means connecting said disk to said pendulum load-counterbalancing mechanism to be revolved thereby, members located on opposite sides of said disk, and means for moving said members toward each other to press a portion of said disk between them.

LAWRENCE S. WILLIAMS.